(12) United States Patent
Rich et al.

(10) Patent No.: US 9,056,422 B2
(45) Date of Patent: Jun. 16, 2015

(54) METHODS AND APPARATUS FOR ENCODED TEXTURES

(71) Applicants: Travis Rich, Cambridge, MA (US); Andrew Lippman, Salem, MA (US)

(72) Inventors: Travis Rich, Cambridge, MA (US); Andrew Lippman, Salem, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/244,704

(22) Filed: Apr. 3, 2014

(65) Prior Publication Data

US 2014/0301179 A1 Oct. 9, 2014

Related U.S. Application Data

(60) Provisional application No. 61/810,223, filed on Apr. 9, 2013.

(51) Int. Cl.
*G11B 7/24* (2013.01)
*B29C 67/00* (2006.01)

(52) U.S. Cl.
CPC ............ *B29C 67/0088* (2013.01); *Y10T 29/49* (2013.01)

(58) Field of Classification Search
None
See application file for complete search history.

(56) References Cited

U.S. PATENT DOCUMENTS

| | | | |
|---|---|---|---|
| 200,521 A | 2/1878 | Edison | |
| 5,144,552 A * | 9/1992 | Abe | 369/275.4 |
| 5,245,165 A | 9/1993 | Zhang | |
| 5,315,098 A | 5/1994 | Tow | |
| 5,357,499 A * | 10/1994 | Nomoto | 369/120 |
| 5,359,591 A * | 10/1994 | Nomoto | 369/275.4 |
| 5,453,969 A * | 9/1995 | Psaltis et al. | 369/110.01 |
| 5,471,455 A * | 11/1995 | Jabr | 369/109.02 |
| 5,559,787 A * | 9/1996 | Nomoto | 369/112.02 |
| 5,572,508 A * | 11/1996 | Satoh et al. | 369/44.26 |
| 5,577,016 A * | 11/1996 | Inagaki et al. | 369/275.4 |
| 5,748,607 A * | 5/1998 | Ohira et al. | 369/275.4 |
| 5,896,366 A * | 4/1999 | Ogawa | 369/275.4 |
| 5,946,288 A * | 8/1999 | Ogawa | 369/275.4 |
| 6,076,738 A | 6/2000 | Bloomberg et al. | |
| 6,212,158 B1 * | 4/2001 | Ha et al. | 369/275.4 |
| 6,510,129 B1 * | 1/2003 | Hirokane et al. | 369/275.4 |
| 6,704,274 B2 * | 3/2004 | Takahata et al. | 369/275.4 |
| 6,791,938 B2 * | 9/2004 | Endoh | 369/275.4 |
| 6,819,650 B2 * | 11/2004 | Deno et al. | 369/275.4 |

(Continued)

OTHER PUBLICATIONS

Cula, O., et al., 2004, 3D Texture Recognition Using Bidirectional Feature Histograms. International Journal of Computer Vision, vol. 59, Issue 1, pp. 33-60, Aug. 2004, Kluwer Academic Publishers Hingham, MA, USA.

(Continued)

*Primary Examiner* — Tan X Dinh
(74) *Attorney, Agent, or Firm* — Stephen R. Otis

(57) ABSTRACT

In exemplary implementations of this invention, a manufactured physical object includes surface features that encode information according to a code. Each respective surface feature consists of a bump on, or recess in, a surface of the object. Each respective surface feature by itself, regardless of any state of any other surface feature, encodes a sequence of multiple bits. The sequence is determined, at least in part, by a discrete elevation of the respective surface feature. At least three different discrete elevations of surface features are significant in the code. Also, one or more other parameters of the surface features may be significant in the code, such as discrete rotational orientation, discrete overall shape, discrete color, or presence or absence of the feature.

16 Claims, 6 Drawing Sheets

(56) References Cited

U.S. PATENT DOCUMENTS

| | | | |
|---|---|---|---|
| 6,982,944 B2* | 1/2006 | Suenaga et al. | 369/275.4 |
| 7,038,998 B2* | 5/2006 | Fujita et al. | 369/275.4 |
| 7,283,459 B2* | 10/2007 | Ootera | 369/275.4 |
| 7,656,779 B2* | 2/2010 | Morishima et al. | 369/275.4 |
| 7,680,024 B2* | 3/2010 | Xu et al. | 369/275.4 |
| 7,772,521 B2 | 8/2010 | Smith, Jr. et al. | |
| 8,262,001 B2 | 9/2012 | Yim et al. | |
| 8,376,739 B2 | 2/2013 | Dupray et al. | |
| 8,534,566 B2 | 9/2013 | Pettersson et al. | |
| 2012/0145779 A1 | 6/2012 | Bietenbeck et al. | |
| 2013/0037619 A1 | 2/2013 | Key | |
| 2013/0124413 A1 | 5/2013 | Itwaru | |

OTHER PUBLICATIONS

Sachs, E., et al., Surface Texture by 3D Printing. Date: apparently 1994. Accessed online on Apr. 29, 2014 at http://utwired.engr.utexas.edu/lff/symposium/proceedingsArchive/pubs/Manuscripts/1994/1994-08-Sachs.pdf.

Song, H., et al., 2006, ModelCraft: capturing freehand annotations and edits on physical 3D models. Proceedings of the 19th annual ACM symposium on User interface software and technology (UIST '06), pp. 13-22 , ACM New York, NY, USA 2006.

Anonymous Wickipedia Authors, 2014, Braille. Wickipedia. Accessed on Apr. 29, 2014 at http://en.wikipedia.org/wiki/Braille.

Anonymous Wickipedia Authors, 2014, Compact Disc. Wickipedia. Accessed on Apr. 29, 2014 at http://en.wikipedia.org/wiki/Compact_disc.

Anonymous Wickipedia Authors, 2014, Phonograph. Wickipedia. Accessed on Apr. 29, 2014 at http://en.wikipedia.org/wiki/Phonograph.

* cited by examiner

METHODS AND APPARATUS FOR ENCODED TEXTURES

RELATED APPLICATIONS

This application is a non-provisional of, and claims the benefit of the filing date of, U.S. Provisional Application No. 61/810,223, filed Apr. 9, 2013, the entire disclosure of which is herein incorporated by reference.

FIELD OF THE TECHNOLOGY

The present invention relates generally to texture codes.

BACKGROUND

Textured surfaces of physical objects have been used to encode information.

For example, a compact disc (CD) may encode audio information using tiny indentations (called pits) and areas between pits (called lands) on the surface of the CD. In a conventional CD, a transition between a pit and a land (or vice versa) may encode a 1, while no change may indicate a zero or string of zeroes.

A phonograph has a textured surface that encodes analog audio data. Braille uses patterns of bumps (e.g. embossments) to encode letters, punctuation and words. For example, if a 3 row by 2 column array of Braille positions has only one bump in the upper left corner of the array, and no other bumps in the array, then the array of positions encodes an "a" or a "1" in Braille.

The rotational position of triangular data glyphs has been used to encode information. Some data glyphs are embossed or engraved.

SUMMARY

In exemplary implementations of this invention, a non-uniform, textured surface of an object is encoded with surface features. Each surface feature (e.g., a bump or recess) encodes more than one bit of information.

In a particular example of this invention, a recess may be at one of three discrete depths: depth A, depth B, or depth C, where depth C is deeper than depth B, and depth B is deeper than depth A. Also, in this particular example, the recess has a non-rotationally invariant shape and may be in one of four discrete rotational orientations, e.g., up, down, right or left. Thus, in this particular example: (a) there are twelve possible combinations of discrete depths and discrete rotational positions; (b) a single recess can encode one of twelve different values; and (c) a single recess can encode a sequence of four binary digits (bits).

Advantageously, recesses of different depths have different levels of darkness, when illuminated by a uniform, diffuse light source.

According to principles of this invention, for any given surface feature (e.g., a bump or recess), one or more discrete parameters of the surface feature may be used to encode information, such that each of these surface features, respectively, encodes more than one binary digit (bit) of information. For example, the discrete parameters may be one or more of: elevation (e.g., height or depth), rotational orientation, shape (e.g., square or triangle), color, or presence/absence of a surface feature at a particular position on a surface.

The state of a single position on the surface may be defined by multiple factors, including the presence/absence, elevation, rotation, shape and color of a surface feature at that position. Thus, the state of a single position (or single surface feature) on the surface may encode a sequence of multiple bits (e.g., a sequence of two bits, or three bits, or four bits, or more bits).

In exemplary implementations of this invention, surface features on a physical object can encode instructions for manufacturing the object (including the surface features on the object). Thus, the physical object can be self-descriptive. For example, the surface features may encode data that maps to a STL file (or other CAD file) that represents the object. A single physical object may be encoded with multiple copies of a complete set of instructions for fabricating the object. Thus, even a piece of the object can contain complete instructions for fabricating the object.

The surface features may be fabricated by a subtractive manufacturing approach (e.g., by engraving a planar surface with a laser cutter) or by an additive manufacturing technique (e.g., by fabricating a textured, non-planar surface with a 3D printer).

A camera or other light sensor may be used to capture visual data regarding the surface features (e.g., bumps or recesses). One or more computer processors may analyze the captured visual data to identity discrete parameters of these surface features, decode information that is encoded by the identified parameters, and output signals based at least in part on the decoded information. For example, the camera and computer processors may be housed in a conventional mobile computing device (e.g., a smartphone or cell phone). The signals that are outputted by the processors may comprise instructions for controlling a graphical user interface. For example, the GUI may be displayed by a mobile computing device or computer monitor.

In some implementations, surface features (e.g., bumps and recesses) of a physical object may encode information that is used in a collaborative user interface. For example, the windshield of a model of a car may be encoded with data that identifies the region as the windshield of that car. In this example, a graphical user interface (e.g., displayed by a cell phone or computer monitor screen) may show both (i) an image of the physical object, including the windshield, and (ii) notes or annotation regarding the windshield. Users may use the GUI to revise the notes or add to them. This GUI may be shared among multiple devices, so that multiple human users may work collaboratively when revising or adding to the notes.

The description of the present invention in the Summary and Abstract sections hereof is just a summary. It is intended only to give a general introduction to some illustrative implementations of this invention. It does not describe all of the details of this invention. This invention may be implemented in many other ways.

BRIEF DESCRIPTION OF THE DRAWINGS

In FIG. 2, different surface features have different combinations of parameters (e.g., elevation and rotational position) of the surface features.

The above Figures show some illustrative implementations of this invention, or provide information that relates to those implementations. However, this invention may be implemented in many other ways. The above Figures do not show all of the details of this invention.

DETAILED DESCRIPTION

In exemplary implementations of this invention, codes can be fabricated into the surfaces of physical objects. These codes can be realized by creating a recess (or inversely yet equivalently, a bump) in the surface of an object in a deterministic fashion, such that the resulting transformed object contains a non-uniform surface texture.

These codes are not merely represented by the presence or absence of a recess/bump (which, if they were, would represent a binary code). The primitive of this encoding is capable of varying in several dimensions. These dimensions include depth of the recess (or height of the bump), shape of the recess/bump, rotation of the recess/bump, or color of the recess/bump. For example, the encoding could have several depths of recesses that each define (or help to define) a discrete state.

For example, the state of a position on the surface may be defined by both (a) the presence/absence of the recess/bump at that position, and (b) the height of the recess/bump. This state can encode more than one bit of data. Similarly, non-rotationally invariant shapes (e.g., triangle, squares, rectangles, or polygons) can be chosen, such that their rotation could vary from state to state, encoding an additional dimension of data.

Figure 1A:
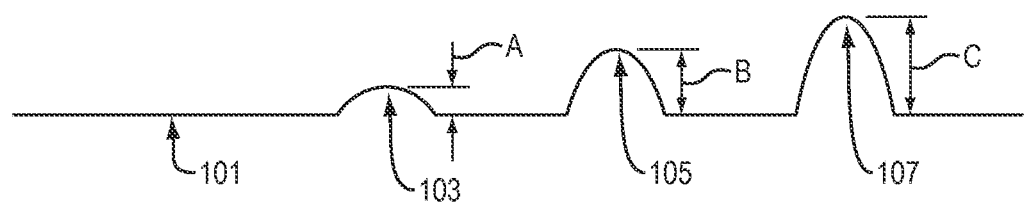
FIG. 1A shows bumps on a surface, where the height of the bumps vary.

FIG. 1A shows an example of bumps on a surface, where the height of the bumps vary. In FIG. 1A: a bump is absent from position 101 of the surface. Bump 103 has a height A, bump 105 has a height B, and bump 107 has a height C. Height C is higher than height B, and height B is higher than height A. In some cases, the absence of any bump/recess may be treated simply as an elevation of zero, for purposes of the code.

Elevation of a bump or recess on a surface (e.g., how high a bump is, or how deep a recess is) may be defined relative to the elevation of a surrounding or adjacent area of the surface.

Elevation of a surface feature may be defined as a discrete value. For example, an encoding scheme could be used in which: (a) any elevation in a range between −0.035 mm and −0.045 mm may be treated as a discrete value 10 (in base 2); (b) any elevation in a range between −0.025 mm and −0.015 mm may be treated as a discrete value 01 (in base 2); (c) any elevation in a range −0.005 mm and +0.005 mm may be treated as a discrete value 00 (in base 2); and (d) intermediate values (e.g., −0.020 mm) may not have significance in the encoding scheme. Thus, in some implementations, only discrete values of elevation are significant in the code.

In some cases, elevation of a surface feature may be estimated from optical parameters of the surface feature. For example, a recess with a deeper depth may appear darker than a recess with a shallower depth, when illuminated by a uniform, diffuse light.

If elevation is estimated (e.g., from a parameter of a surface feature such as how dark a recess appears), then the estimated elevation may an average elevation for the surface feature as a whole or for a region of the surface feature.

In some implementations, a transition from a first elevation to a second elevation is not significant in the encoding scheme. In other implementations, a transition from a first elevation to a second elevation is significant in the encoding scheme.

Depending on the particular implementation of this invention, elevation of a surface feature on the surface may be measured or estimated at certain locations, such as: (a) at multiple points (e.g., so that an average may be calculated); (b) in a region where elevation is constant; (c) at points in an array of points; (d) at a center or centroid or in a central region; or (e) at a critical point, stationary point, local maximum or local minimum.

Figure 1B:
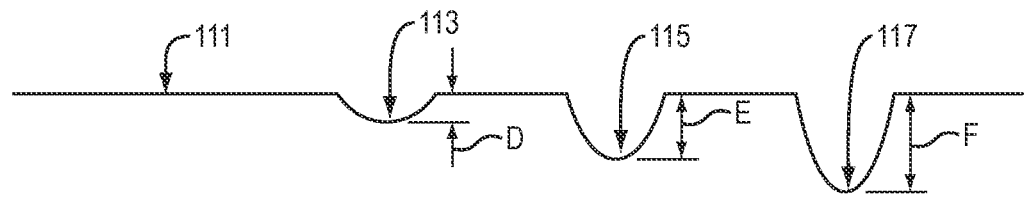
FIG. 1B shows recesses on a surface, where the depth of the recesses vary.

FIG. 1B shows an example of recesses on a surface, where the depth of the recesses vary. In FIG. 1B: a recess is absent from position 111 of the surface. Recess 113 has a depth D, recess 115 has a depth E, and recess 117 has a depth F. Depth F is deeper than depth E, and depth E is deeper than depth D.

Figure 1C:
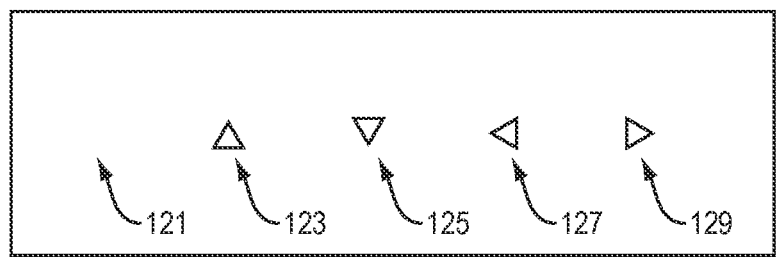
FIG. 1C show surface features on a surface, where the surface features are in different rotational positions.
Figure 2:
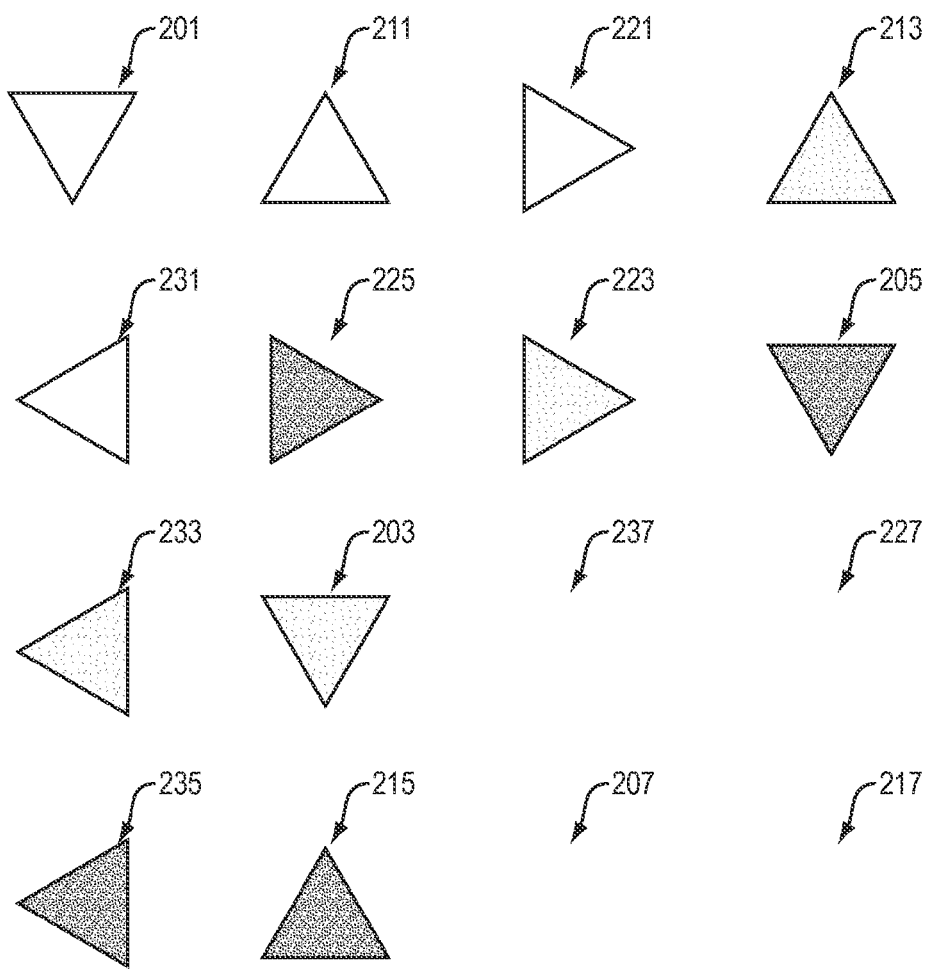
FIG. 2 shows multiple surface features.

FIG. 1C show an example of surface features on a surface, where the surface features are in different rotational positions. In FIG. 1C: a triangular surface feature is absent from position 121 of the surface. Triangle 123 is oriented at 90 degrees. Triangle 125 is oriented at 270 degrees. Triangle 127 is oriented at 180 degrees. Triangle 129 is oriented at 0 degrees. In FIGS. 1C and 2, rotational orientation is measured clockwise from a reference vector.

FIG. 2 shows multiple surface features. In FIG. 2, different surface features have different combinations of parameters (i.e., elevation and rotational position) of the surface features. In FIG. 2: Depth C is deeper than depth B, and depth B is deeper than depth A. The recesses at different positions have depths and rotational orientations, as follows:

The recess at position 201 has a depth A and is oriented at 270 degrees.

The recess at position 203 has a depth B and is oriented at 270 degrees.

The recess at position 205 has a depth C and is oriented at 270 degrees.

The recess at position 211 has a depth A and is oriented at 90 degrees.

The recess at position 213 has a depth B and is oriented at 90 degrees.

The recess at position 215 has a depth C and is oriented at 90 degrees.

The recess at position 221 has a depth A and is oriented at zero degrees.

The recess at position 223 has a depth B and is oriented at zero degrees.

The recess at position 225 has a depth C and is oriented at zero degrees.

The recess at position 231 has a depth A and is oriented at 180 degrees.

The recess at position 233 has a depth B and is oriented at 180 degrees.

The recess at position 235 has a depth C and is oriented at 180 degrees.

The recesses at positions 207, 217, 227 and 237, respectively, are absent.

This invention is not limited to discrete rotational orientations that are 90 degrees apart. For example, a code can use discrete rotational values that are 15 degrees apart, or 30 degrees apart, or 45 degrees apart, or x degrees apart, where x is a non-zero divisor (with no remainder) of 360.

In an example of this invention: A manufactured physical object includes surface features that encode information according to a code. Each respective surface feature consists of a bump on, or recess in, a surface of the article of manufacture. Each respective surface feature by itself, regardless of any state of any other surface feature, encodes a sequence of multiple bits. The sequence is determined, at least in part, by a discrete elevation of the respective surface feature. At least three different discrete elevations of surface features are significant in the code. Each of the three discrete elevations, respectively, occur in one or more of the surface features on the surface. In this example, the elevation of a surface feature is defined relative to a region of the surface that is immediately adjacent to the surface feature.

In this example, one or more other parameters may be significant in the code. Among other things, the sequence encoded by each respective surface feature can be further determined in part by one or more of the following parameters of the surface: (a) discrete rotational orientation; (b) discrete overall shape; or (c) discrete color. Furthermore, the presence or absence of a surface feature, or of a specific type of surface feature, may be a parameter used in the coding scheme.

In this example, the surface features that are significant in the code can all be concave, all be convex, or some of them can be concave and some of them convex. In some cases, the surface features that are significant in the code can all be bumps, or all be recesses, or one or more of them can be bumps and one or more of them can be recesses.

In this example, the surface features can encode instructions for manufacturing the article of manufacture including the surface features. For instance, the surface features can encode values that map to a digital CAD representation of the physical object (e.g., in STL format). Or, for instance, the sequence can have a bit-length that is greater than or equal to three.

In some implementations of this invention: Surface features located in a first region of the surface can encode a first copy of a complete set of instructions for manufacturing the article of manufacture. Likewise, surface features located in a second region of the surface encode a second copy of the complete set of instructions. And so on for third, fourth and other regions of the surface.

In some embodiments of this invention, a fabricated physical object encodes information according to a code. In these embodiments, a set of regions exist on a surface of the object. Each respective region, out of the set of regions, has a state, the state being defined by one or more parameters that are significant in the code. The parameters for any given region include discrete elevation of the given region. At least three different discrete elevations are significant in the code. Each of the three discrete elevations, respectively, occur in one or more of the regions. In these embodiments, elevation of any given region is defined relative to elevation of an area of the surface that is immediately adjacent to and surrounds the given region. The regions can encode instructions for fabricating the physical object.

In some implementations of this invention, a single surface feature, or a single position on the surface, can, regardless of the state of other surface features or positions on the surface, encode a sequence of multiple bits, which sequence includes one or more "1's" and one or more "0's" (in this sentence, a "1" means one of two logical values of a binary digit, and a "0" means the other of the two logical values of a binary digit).

Depending on the particular implementations of this invention, a wide variety of codes may be used. For example, a code may use the states of the surface features themselves (e.g., a triangle at 90 degrees and at a certain elevation may encode a sequence of four binary digits such as 1001). Alternately, change in state, or no change in state, from position to position may be significant in the code (e.g, if a non-return-to-zero, inverted code is used). Or, for example, a Gray code may be employed, with a Hamming distance of one between consecutive values.

In some implementations of this invention, varying bumps and recesses in an objects surface encode data in such a way that the decoded data can be used to regenerate the object itself (with the surface encoding being reproduced as well).

The required resolution and complexity of the encoding is dependent on the complexity of the object being represented. The data begins as a digital electronic representation of the 3-dimensional physical object. For example, the object may be described using a .STL (Standard-Tessellation Language) file, which represents the object as a series of triangles. The vertices of these triangles are then stored and converted into a series of binary or super-binary codes that are mapped to a 2D surface. This surface encoding is then "wrapped" around a model of the object itself, transforming the object into a version of itself with small recesses or bumps across its surface (creating an encoded surface texture). When encoded information is sensed (e.g., through optical detection) and decoded, the information can be used to reproduce the original .STL file and the object it describes.

Depending on the achievable density of the surface encoding, the full encoding of the object may be repeated across the object a multitude of times—enabling even a broken piece of the object to describe the original object in full.

Figure 3:
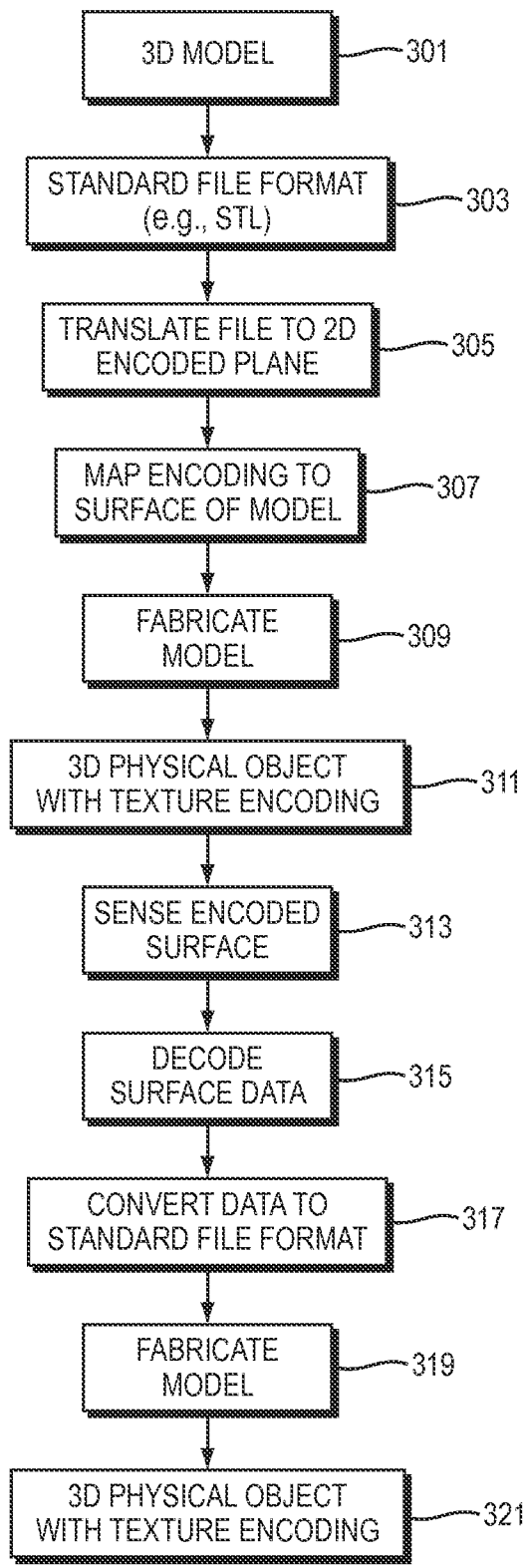
FIG. 3 is a flow chart for a method of creating and replicating a self-descriptive physical object. The method involves using surface features of an object to encode a complete set of instructions for fabricating the object, and then decoding these surface features and using the instructions to replicate the object.

FIG. 3 is a flow chart for a method of creating and replicating a "self-descriptive" physical object. The method involves using surface features of an object to encode a complete set of instructions for fabricating the object, and then decoding these surface features and using the instructions to replicate the object. In the example shown in FIG. 3, a planar surface texture mapping is wrapped to a 3-dimensional non-planar object. The desired end result is an object with a non-uniform surface texture which encodes data through the variation of bumps and recesses across its surface. These bumps and recesses may start off as a digital representation of high/low data values, and then be mapped to a physically real object through fabrication. For example, these physical 3D objects may be fabricated using a 3D printer. Given the limitations of the physical 3D printing hardware, the geometry of the object itself, and the desire to have readable codes, several steps may be required to produce a robust encoding.

The process may begin by performing a 3D-to-2D unwrap of the object of interest. Existing techniques can be applied here, such as a simple UV unwrap. The surface area of the object is then calculated. Given the resolution of the fabrication tool to be used (the smallest unit that can be 3D printed, for example), a maximum data density, and thus data storage size is calculated. The data storage size is the amount of data that can be stored on the object given the object's surface size. This value is then compared with the amount of data required to represent the original object. Given sufficient area, an encoding pattern is then populated across a 2D plane. This encoding pattern is then compared to the unwrapped model and problematic features, such as a sharp angle or occluded section are detected. The encoding on the 2D plane is then adjusted to account for and remove encoding from these problematic areas. The 2D encoded plane is then overlaid onto the 2D unwrapped object. The 3D object is then reconstructed and the encoded plane is thus wrapped with it.

A displacement map then creates recesses or bumps as dictated by the encoded plane. This results in a 3-dimensional object with a textured surface. This object can then be rendered in the software used to drive the chosen 3D printer or fabrication tool and created.

In the example shown in FIG. 3, one or more computer processors: (a) compute or retrieve from memory a 3D model 301 that is in a standard file format (e.g., STL) 303; (b) translate the file to a 2D encoded plane 305; (c) map the encoding to a surface of the model 307; and (d) output control signals to cause physical fabrication of the model 309. This fabrication produces a 3D physical object with texture encoding 311. One or more cameras or other visual sensors sense the encoded surface 313. One or more computer processors then: (a) decode the surface data 315; (b) convert data to standard file format 317; and (c) output control signals to cause physical fabrication of the model 319. The second physical object 321 is a copy of the first physical object 311. Each of the first and second objects is self-descriptive, in that it has surface features that encode a complete set of instructions for fabricating itself (including the surface features).

In exemplary implementations of this invention, one or more digital fabrication tools are used to create objects whose surfaces vary in some deterministic fashion such that data is encoded. This encoding is generated through the variation in fabrication primitives as allowed by the tool. The complexity and space of the encoding is dependent on the number of varying primitives which can be generated by the fabrication tool. For example, a digital 3D printer can print bumps or recesses of varying height which may be used to encode super-binary data. Similarly, a digital, programmable sewing machine can be used to sew a multitude of stitch patterns, enabling the stitch pattern to represent a super-binary code.

Figure 4:
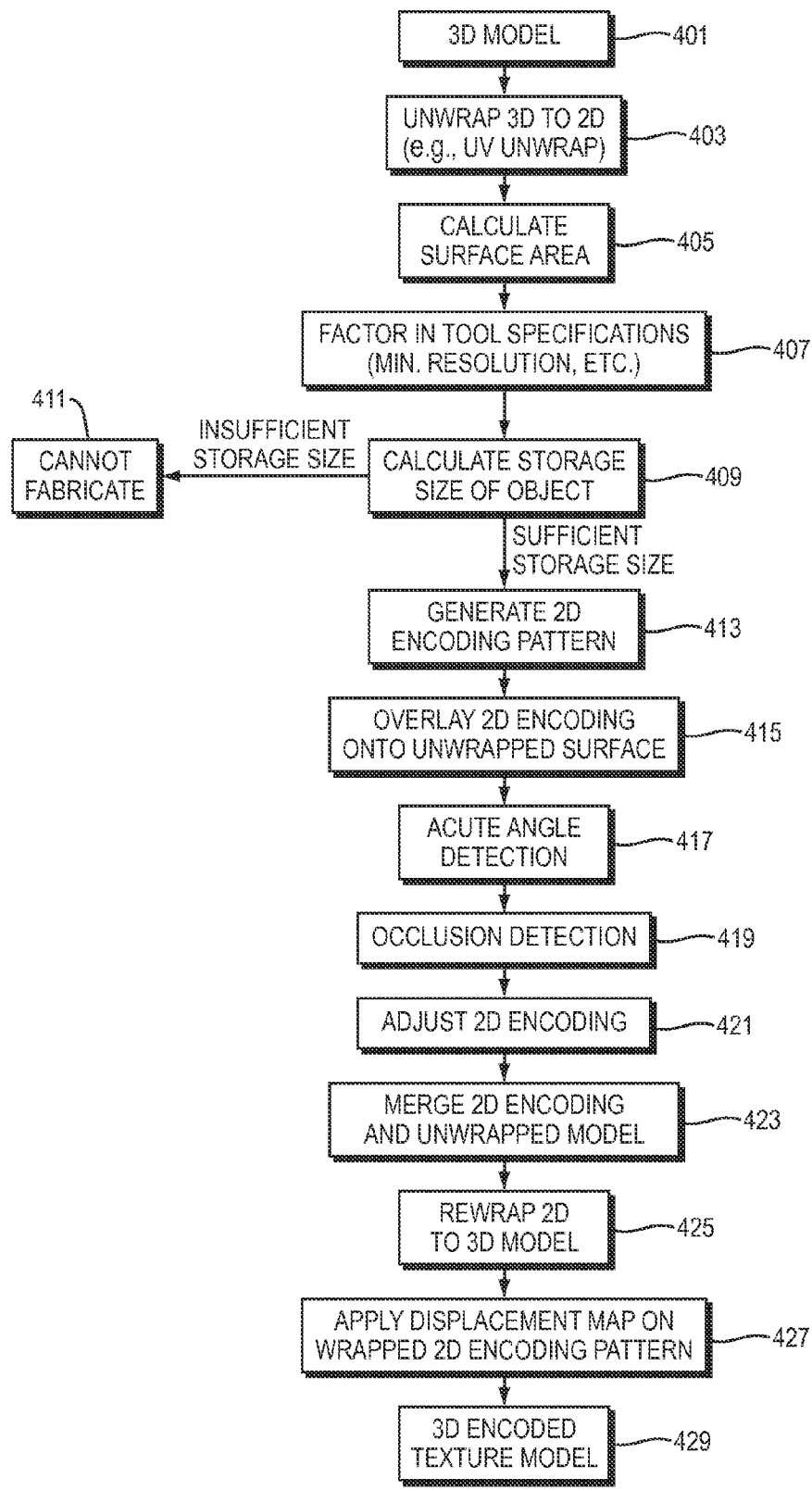
FIG. 4 is a flow chart for a method of wrapping texture onto a 3D virtual model.

FIG. 4 is a flow chart for an illustrative method of wrapping texture onto a 3D virtual model. In the example shown in FIG. 4, one or more computer processors: (a) compute or retrieve from memory a 3D CAD model 401; (b) unwrap the model from 3D to 2D (e.g., using a UV unwrap) 403: (c) calculate a surface area 405; (d) factor in tool specifications (e.g., minimum resolution) 407; (d) calculate the storage size of the object (where storage size is the amount of data that can be stored on the object's surface given the surface area and maximum achievable data density of the fabrication process) 409; (e) if the storage size is insufficient, determine that the object cannot be fabricated 411; (f) if the storage size is sufficient; generate a 2D encoding pattern 413; (g) overlay a 2D encoding pattern onto the unwrapped surface 415; (h) detect acute angles in the unwrapped surface 417; (i) detect angles in the unwrapped surface 419; (j) adjust the 2D encoding 421; (k) merge the 2D encoding and unwrapped model 423; (l) rewrap the merged 2D model into a 3D model 425; (m) apply a displacement map on the wrapped 2D encoding model 427; and (n) output a 3D encoded texture model 429.

Figure 5:
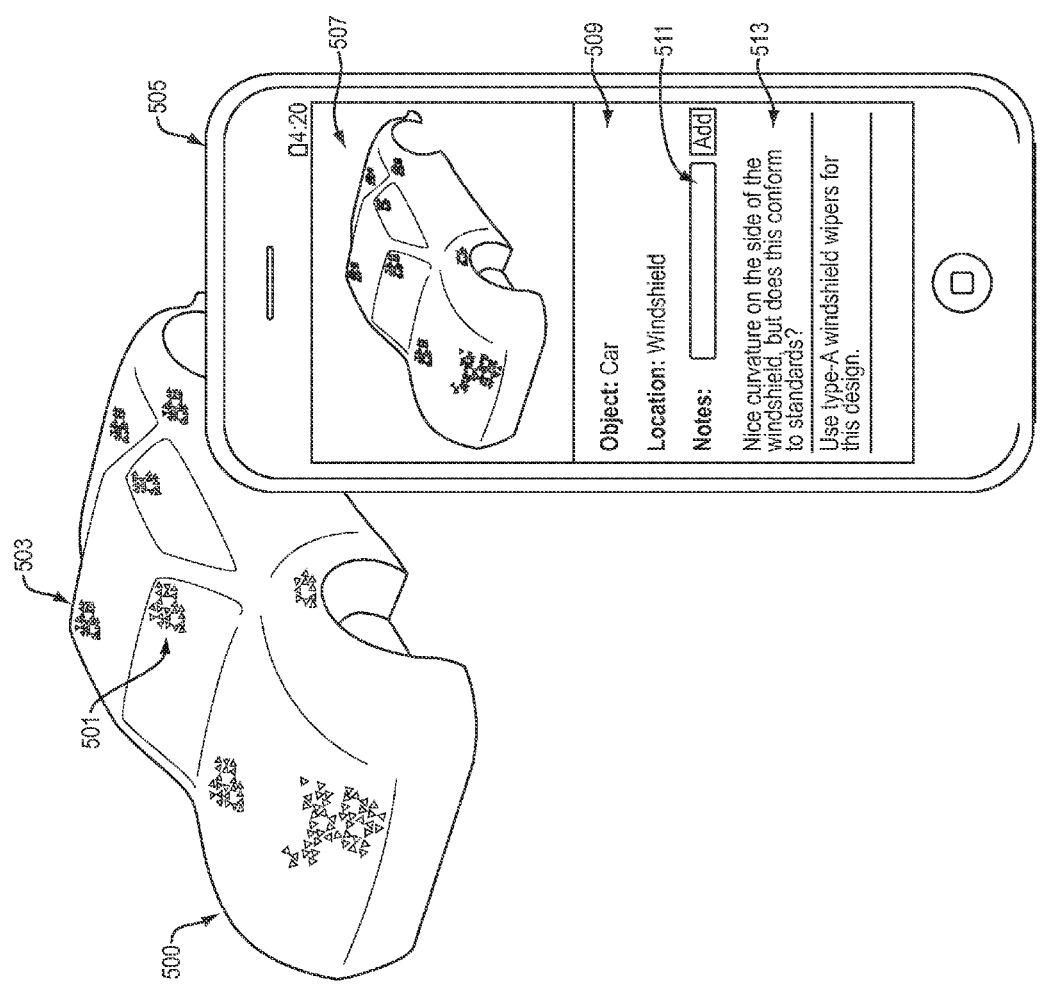
FIG. 5 shows a cell phone and a physical model of a car, where surface features on the car encode data used in a GUI displayed by the cell phone.

FIG. 5 shows a cell phone and a physical model of a car, where surface features on the car encode data used in a GUI displayed by the cell phone. In the example shown in FIG. 5: A physical model of a car 500 has surface features that encode information, including surface features on the windshield 501 and roof 503 of the model. The information encoded by a given surface feature may comprise, for example: (a) data identifying the location on the car (e.g., windshield); (b) data identifying the type of physical model (e.g., a car); or (c) data containing information, comments or instruction regarding (i) the region of the car where the given surface feature is located or (ii) the car generally. A mobile computing device (e.g., a smart phone, cellphone or tablet) 505 includes a display screen that displays a graphical user interface (GUI). The GUI includes two regions. The first region displays an image of the car model 507. The second region 509 of the GUI includes an area 511 into which a user may input notes, information or comments. The second region 509 of the GUI also includes a display of notes, information or comments 513 that have previously been entered by users (e.g., via the GUI) or, optionally, that have been encoded by surface features on the car model. In situations in which the storage size (amount of data that can be encoded) is limited (e.g., due to a small surface area or low resolution fabrication process), it is possible to store such comments or notes in external digital electronic memory, and to limit the information encoded by the physical surface features to only certain types of information (e.g., location of the surface feature or identity of part on which the surface feature is positioned). In some implementations, the GUI is displayed on multiple devices simultaneously and multiple users can input notes, comments or information via the GUI. By using the GUI on multiple devices simultaneously, multiple users may be able to collaborate on annotating the car model in real-time or near real-time.

In exemplary implementations of this invention: Physical objects are fabricated with machine-readable encoded features on their surfaces. These encoded features, or encoded textures, are optically readable by computer vision systems and can be decoded to reveal information about that object. A mobile interface, web-backend, and browser interface facilitate interaction with these encoded objects. Surfaces of objects contain deterministic textures, cavities, and features that encode digital information. Combining these features with a mobile, optical decoder application and a web backend, a system allows for community collaboration and annotation around physical, passive objects.

In a first prototype of this invention, a laser cutter can be used to etch varying surface features onto a planar surface of the object. The laser cutter works directly from a bitmap image, where varying levels of darkness correlate to varying depths of cut. Alternatively, in a second prototype of this invention, a 3D printer is used to fabricate non-planar, 3D surfaces and objects. The 3D printer works from computer-aided design (CAD) models that depict the surface of the object that is to be printed.

In both approaches (planar and non-planar objects), small cavities can be used as the base feature of the encoding. Cavities can be easily fabricated. Advantageously, if cavities are small enough, they remain dark in comparison to the rest of the surface when front-illuminated with a uniform light source. This allows for simple optical detection using a threshold to separate the dark encoding from the bright surface, providing a quick and easy encoding device across a wide range of materials.

In the first prototype, to fabricate planar surfaces with an encoded texture pattern, a laser cutter is used. For example, a laser cutter can create patterns on a wide range of materials including acrylic, wood, vinyl, and more. In this first prototype, a laser cutter reliably provides a resolution of 600 DPI (dots per inch). The laser cutter can take a grey-scale bitmap and map black to a maximum laser intensity and white to a minimum laser intensity, resulting in deeper and shallower marks respectively. A pattern of primitives can be computationally generated to create an image that is then laser cut onto a surface. For example, a laser cutter may etch patterns onto cylindrical tokens made of quarter-inch plywood.

In the first prototype, to make the encoded pattern optically readable, each primitive is larger than the minimum resolution of the laser cutter (600 DPI). This is done to counter the effects of non-deterministic burning of the material and inaccuracies in the laser head movement. A minimum cavity diameter of 0.015" is achieved.

In the second prototype, a 3D printer fabricates non-planar objects with an encoded pattern. The encoding can begin by creating a two-dimensional (2D) image of a texture pattern (what will become a series of cavities). While it is straightforward to map a 2D pattern to 3D objects of revolution (such as cylinders and cones), spheres and more complex bodies do not have as straightforward of a method. However, displacement maps can be used to apply a 2D encoded pattern to a 3D CAD model.

Bump maps are a familiar and often used tool in the field of computer graphics. Bump maps effect the lighting that falls on a model to produce the appearance of textures or bumps. That is, a bump map does not actually change the mesh geometry of the object, rather just the behavior of the light that falls on it. Displacement maps are similar to bump maps, in that they can be applied as a "texture" to the object, but critically, they actually deform the geometry of the model. Steps in displacement mapping include UV unwrapping, or UV mapping. This process entails "unwrapping" the 3D model to a 2D surface, defining a 2D bitmap and overlaying the two. With this process, boundaries for complex 3D objects can be defined, which otherwise would not have a trivial 2D unwrap.

By using UV unwrapping, an encoded pattern bitmap can be applied as a displacement map.

A displacement map can be as detailed as the underlying mesh. To generate fine features, it is therefore desirable to subdivide any mesh that is being used to an appropriate resolution. The downside of such a technique is that to achieve the resolution and accuracy desired, CAD models with many millions of faces are often needed. Even with modern computing power, manipulating such large mesh datasets can be very slow and tedious. Thus, it is desirable to weigh the tradeoffs of higher accuracy versus modeling capability and to find the proper balance.

Once the CAD model has been generated, a 3D printer can be used to fabricate a physical object. This approach (with a 3D printer) is well-suited for fabricating non-planar encodings.

Some 3D printers work primarily with translucent materials. However, it can be difficult to robustly detect surface features (e.g., recesses or bumps) in a surface consisting of translucent materials. To avoid this problem, a negative of the object can be used. For example, the negative of an object can be printed. The negative can then be used to cast a positive. For example, the positive may comprise an opaque silicone rubber.

In exemplary implementations of this invention, augmented reality toolkits are used to visually identify surface features. These toolkits work to detect high contrast edges and corners in a given image view. Thus, such toolkits work well with the cavity method of encoding that produces dark encoded patterns on an otherwise brightly illuminated surface. Alternately, other approaches may be used for measuring surface features. A user interface and a web-backbone may be used on top of this image analysis software.

In exemplary implementations, a user interface may be either a mobile version or a browser version. The mobile version can incorporate a preview of the camera's field-of-view with information about the most recently scanned object. The information about the current object is delivered by the web-backbone that associates chunks of information with a unique physically encoded identifier. There also exists an entry field that allows users to add notes, comments, ideas, or questions. When added, these comments are added to the central body of knowledge associated with that given scan point, allowing the data set to grow.

The web interface mirrors the results of the mobile device, showing the details of the encoding most recently read by the mobile application. Websockets are used to create a persistent and open connection between the browser window and the server that is hosting the data, allowing for real time updates. The browser interface also renders the 3D CAD model of the object most recently scanned, as well as a list of all the data points previously scanned on that object. The CAD model environment uses a spotlight effect to highlight the location of the object that has been most recently scanned. This allows the browser to, in a sense, display where the camera of the mobile device is pointed. An entry field to add questions and annotations is also present.

Because of the persistent connection between the mobile device, browser, and server, a near real-time experience is created. Notes added on one instance of the browser or mobile application are automatically populated into the other instances of the interface. In this way, a collaborative environment is created where multiple people can open their own individual browser interfaces or mobile applications and communally add notes, questions, or ideas around the physically encoded point.

This invention has many practical applications. Here are some non-limiting examples:

First example: encoded tokens. In this example, a series of planar tokens are fabricated in bulk using a laser cutter. Each token is uniquely encoded with between 8 and 32 bits of data. The tokens have been distributed and used at several community events. The tokens were distributed to hundreds of people and used to authenticate admission and access to food and drink. Given that each coin is uniquely encoded, the presence and behavior of each person can be monitored to make sure no one is consuming more than their fair share of food or entrance.

Second example: encoded car model. In modeling new designs, it is often useful to fabricate a prototype so as to have a physical object around which iterations and design changes can be made. In this second example, a 3D car model is fabricated with its top surface encoded with deterministic cavities (FIG. 5). By using the mobile application to read the encoded pattern at specific points, annotations and design critiques can be added to specific locations across the model. Furthermore, as the encoding is contained in the source CAD file, multiple copies of the model can be printed in numerous locations and collaboratively analyzed and critiqued using the networked web backend.

Third example: encoded food. Encoded surface codes can be used to uniquely encode food products during their manufacturing process. For example, baking trays and utensils can have patterns that encode baked goods as they are cooked. For example, cookies have been made and processed so as to have a bottom that is deterministically encoded. Scanning the cookie with the mobile application delivers the recipe of the cookie to the user.

Fourth example: encoded fabric. A programmable sewing machine may be used to create optically-readable patterns of dark/bright threading that encodes information. For example, the information may be about the object. The threading pattern is not limited to dark/bright. Any optically distinguishable set of parameters may be used for the threading.

In prototypes of this invention: For planar surfaces, primitives have been encoded at a minimum of 0.015". Including the required spacing between primitives (also placed at 0.015"), this yields a maximum data density of over $$1000 \frac{\text{bits}}{\text{in}^2}.$$

For non-planar surfaces, given a particular 3D printer resolution and certain limitations in the CAD modeling (i.e. the workable resolution to which a surface can be subdivided), a minimum implementable bit density can be calculated. For example, in a prototype of this invention, a decodable 7×7 primitive array can be reliably produced on an area of 0.55"× 0.55". This yields a surface area of 0.3025 square inches. Given that a 7×7 array of primitives is encoded through the presence or absence of a primitive, this yields, in this prototype, 49 bits per array, which when combined with the surface area value of 0.3025 square inches yields a bit density of over $$161 \frac{\text{bits}}{\text{in}^2}.$$

For comparison, a conventional UPC barcode (as often found on the container of consumer goods) often encodes around 50 bits on an area of 1.5"×1". This results in a bit density of just over $$33 \frac{\text{bits}}{\text{in}^2}.$$

In exemplary implementations of this invention, an "apply surface encoding" feature is integrated into CAD packages. Using this feature results in the desired CAD model being modified with the appropriately textured encoded surface features.

At sufficient data densities, a point is reached where the surface encoding is rich enough to contain all of the information that describes the CAD model of the object itself. In this way, a kind of "passive-DNA" is created, wherein many small encodings across the entire surface of the object can be used to reproduce the original object in its entirety. This is useful as broken objects and artifacts can be used to fabricate the original piece.

Figure 6:
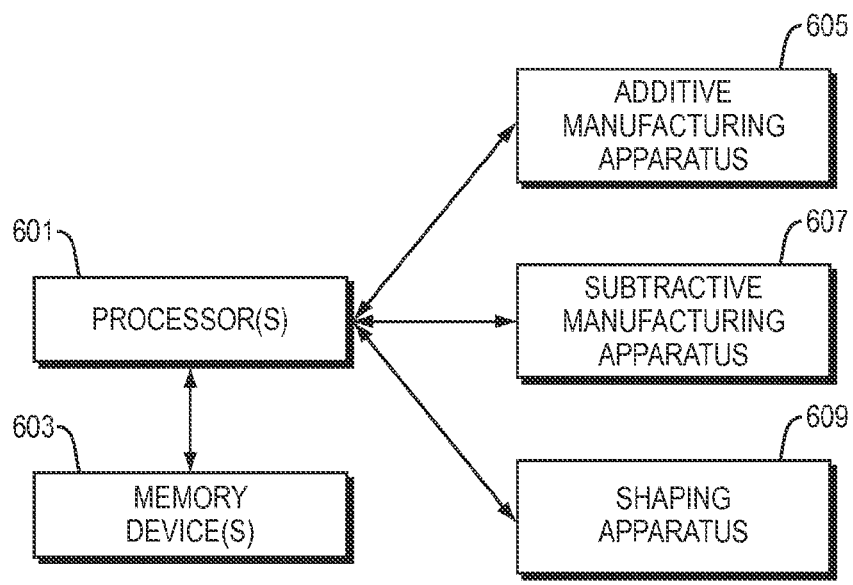
FIG. 6 is a block diagram of hardware that may be used in fabricating surface features.

FIG. 6 is a block diagram of hardware that may be used in fabricating surface features (e.g., recesses or bumps) that encode information. In the example shown in FIG. 6: one or more processors 601 receive sensor feedback from, or output control signals to control the operation of, any one or more of: (1) additive manufacturing apparatus 605, (2) subtractive manufacturing apparatus 607, or (3) shaping apparatus 609, at the same time or at different times. The one or more processors 601 read data from, and write data to, electronic memory 603.

The additive manufacturing apparatus 605 may comprise, for example, any type of 3D printer, including any 3D printer configured for: (a) extrusion deposition (e.g., fused deposition modeling); (b) electron beam freeform fabrication; (c) fusing or agglomeration of granules (e.g., direct metal laser sintering, electron-beam melting, selective laser melting, selective heat sintering, selective laser sintering, plaster-based 3D printing, or powder and inkjet head 3D printing); (d) lamination (e.g., laminated object manufacturing); or (e) photopolymerization (e.g., stereolithography, or digital light processing).

The subtractive manufacturing apparatus 607 may comprise, for example, any: (a) laser cutter, (b) lathe, milling machine, drill press, or cutting tool, including any apparatus configured for engraving, cutting, machining, turning, boring, drilling, milling, broaching, sawing, shaping, planing, reaming or tapping; or (c) apparatus configured for electrical discharge machining, electrochemical machining, electron beam machining, photochemical machining or ultrasonic machining.

The shaping apparatus 609 may comprise, for example, a bending tool, forming tool, or other apparatus, such as rollers, or a press and a form, that can be used to change the shape of an object.

The subtractive manufacturing apparatus 607 may, for example, be used to remove material from a physical object in order to create surface features (e.g., bumps or recesses) that encode information.

The shaping apparatus 609 may, for example, be used to change the shape of a physical object in order to create surface features (e.g., bumps or recesses) that encode information. For example, the shaping tool may be used to emboss a raised pattern of bumps or inversely to press a recessed pattern of indentations.

The additive manufacturing apparatus 605 may, for example: (a) be used to directly fabricate the object, including the textured surface and surface features that encode information; or (b) be used to fabricate a completely or partially un-textured surface, following by subtractive fabrication to create the encoding surface features by removing material from the surface.

Figure 7:
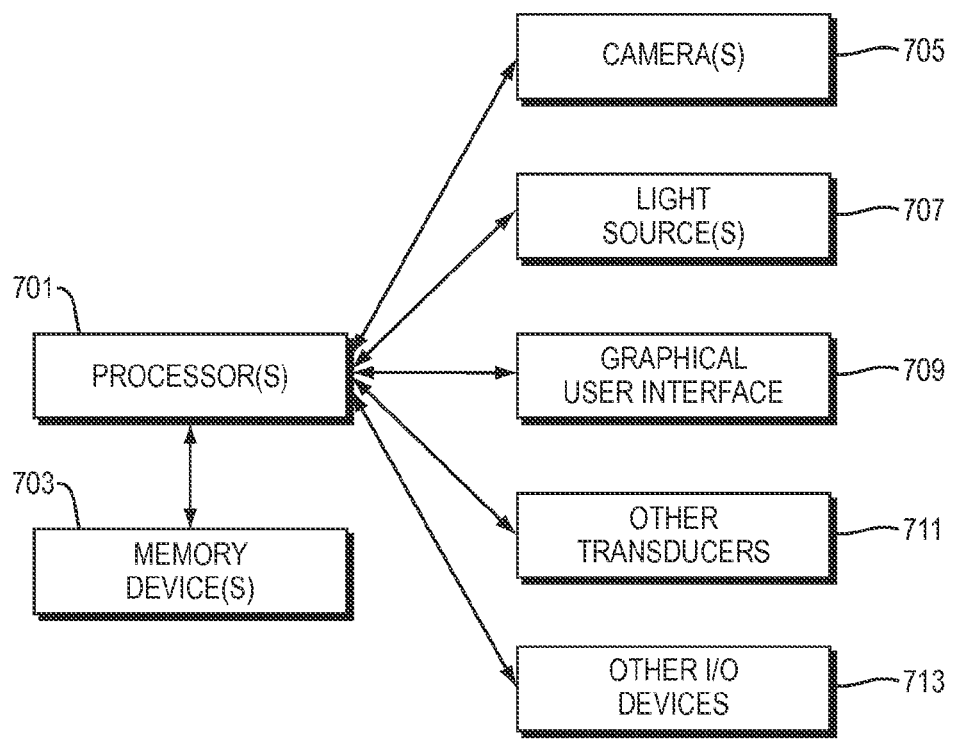
FIG. 7 is a block diagram of hardware that may be used to, among other things: (i) capture visual data regarding surface features; and (i) decode information encoded by the surface features.

FIG. 7 is a block diagram of hardware that may be used to, among other things: (i) capture visual data regarding the surface features and (i) decode information encoded by the surface features. In the example shown in FIG. 7: One or more processors 701 receive sensor data from, or output control signals to control, any one or more of: (a) cameras 705; (b) light sources 707; (c) graphical user interface 709; (d) other transducers 711; or (d) other I/O devices 713. The one or more processors 701 read data from, and write data to, electronic memory 703.

A camera 705 may capture visual data regarding the surface features while a light source 707 illuminates the surface features. A graphical user interface 709 may be used to display information related to an encoded physical object, and may also be used to accept input from a human user, including input comprising notes, comments or information regarding the object. Other transducers 711 and other I/O devices 713, in addition to or instead of a graphical user interface, may be used to accept input from users or to output information to users. For example, a I/O device may comprise a speaker for audibly presenting information, data or notes regarding encoded physical objects. Or, for example, a transducer may comprise a keyboard, mouse or microphone for receiving input from a human user regarding encoded physical objects.

In exemplary implementations of this invention, one or more electronic processors are specially adapted to perform one or more of the following: (1) to control the operation of hardware components, including hardware (e.g., cameras and light sources) for capturing visual data regarding encoded surface features, hardware for interacting with human users (e.g., graphical user interfaces, transducers, I/O devices), or hardware for fabricating objects with encoded surface features (e.g., additive manufacturing, subtractive manufacturing or shaping apparatus); (2) to perform calculations to decode visual data regarding encoded surface features; (3) to perform calculations to wrap surface texture codes into 3D objects; (4) to perform calculations to encode digitally fabricated objects; (4) to receive signals indicative of human input, (5) to output signals for controlling transducers for outputting information in human perceivable format, and (6) to process data, perform computations, and control the read/write of data to and from memory devices. The one or more processors may be located in any position. For example: (a) some or all of the one or more processors may be embedded within or housed together with other hardware components of the system, such as cameras, and (b) some or all of the one or more processors may be remote from other hardware components of the system. The one or more processors may be connected to each other or to other components: (a) wirelessly, (b) by wired connection, or (c) by a combination of wired and wireless connections. For example, one or more electronic processors (e.g., 601 or 701) may be housed in a computer.

Definitions

Here are a few definitions and clarifications. As used herein:

The terms "a" and "an", when modifying a noun, do not imply that only one of the noun exists.

A "bit" means a binary digit. A digit that can be only one of two possible values is a "bit".

A "bump" means a convexity or protuberance on a surface. A "bump" may be of any size. A region of a surface, which region is in the overall shape of a bump, is a "bump", even if it includes finer surface details such as smaller indentations or smaller protuberances.

The term "CAD" means computer-aided design.

The term "comprise" (and grammatical variations thereof) shall be construed broadly, as if followed by "without limitation". If A comprises B, then A includes B and may include other things.

The term "discrete", with respect to a variable used in a code, means that discrete, rather than continuous, values of the variable are used for the code.

The term "e.g." means for example.

The term "elevation" means position along an axis. For example, each of the following are examples of "elevation": (a) height of a bump; (b) depth of a recess; (c) position on a vertical axis; (d) position on an axis, which axis is a local surface normal; or (e) position on a coordinate axis in Euclidean three dimensional space.

A physical feature of a particular type "encodes a sequence of x bits" according to a code, if and only if features of that type can be in any of y discrete states that are significant in the code, where $2^{x-1}+1 \geq y \geq 2^x$. For example: (a) if a surface feature of that type can only be in any of 5 discrete states that are significant in the code, then the surface feature encodes a sequence of 3 bits; (b) if a surface feature of that type can only be in any of 4 discrete states that are significant in the code, then the surface feature encodes a sequence of 2 bits; (c) if a surface feature of that type can only be in any of 2 discrete states that are significant in the code, then the surface feature encodes a sequence of 1 bit; and (d) if a surface feature of that type can be in 3 or more discrete states that are significant in the code, then that surface feature encodes multiple bits.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each can be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes "a third" thing, a "fourth" thing and so on shall be construed in like manner.

The term "for instance" means for example.

The terms "horizontal" and "vertical" shall be construed broadly. For example, "horizontal" and "vertical" may refer to two arbitrarily chosen coordinate axes in a Euclidian two dimensional space, regardless of whether the "vertical" axis is aligned with the orientation of the local gravitational field. For example, a "vertical" axis may oriented along a local surface normal of a physical object, regardless of the orientation of the local gravitational field.

The term "or" is inclusive, not exclusive. For example A or B is true if A is true, or B is true, or both A or B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or can be ignored.

A "recess" means an indentation or concavity on a surface. A "recess" may be of any size. A region of a surface, which region is in the overall shape of a recess, is a "recess", even if it includes finer surface details such as smaller protuberances or smaller indentations.

Spatially relative terms such as "under", "below", "above", "over", "upper", "lower", and the like, are used for ease of description to explain the positioning of one element relative to another. The terms are intended to encompass different orientations of an object in addition to different orientations than those depicted in the figures.

The term "STL" means Standard Tessellation Language.

The term "such as" means for example.

A "Defined Term" means a term that is set forth in quotation marks in this Definitions section. Applicant is acting as his, her or its own lexicographer for the Defined Terms. This Definitions section shall, in all cases, control over and override any other definition of the Defined Terms. For example, the definitions of Defined Terms set forth in this Definitions section override common usage or any external dictionary.

If a given term is not set forth in quotation marks in this Definitions section, but is explicitly or implicitly defined elsewhere in this document, then the explicit or implicit definition of the given term set forth in this document shall, in all cases, control over and override any external definition of the given term.

If a particular term is not explicitly or implicitly defined in this document, but this document provides some clarification regarding the meaning of the particular term, then the clarification of the given term set forth in this document shall, to the extent applicable, control over and override any external definition of the given term.

Variations:

This invention may be implemented in many different ways, in addition to those described above.

Here are some non-limiting examples of how this invention may be implemented:

This invention may be implemented as an article of manufacture that includes surface features that encode information according to a code, wherein: (a) each respective surface feature consists of a bump on, or recess in, a surface of the article of manufacture; (b) each respective surface feature by itself, regardless of any state of any other surface feature, encodes a sequence of multiple bits, which sequence is determined, at least in part, by a discrete elevation of the respective surface feature; and (c) at least three different discrete elevations of surface features are significant in the code, each of the three discrete elevations, respectively, occurring in one or more of the surface features on the surface. In each case, elevation of a surface feature may be defined relative to a region of the surface that is immediately adjacent to the surface feature. Furthermore: (1) the sequence encoded by each respective surface feature may be further determined in part by a discrete rotational orientation of the respective surface feature; (2) the sequence by each respective surface feature may be further determined in part by a discrete shape of the respective surface feature; (3) the sequence encoded by each respective surface feature may be further determined in part by a discrete color of the respective surface feature; (4) the surface features may be concave; (5) the surface features may be convex; (6) the surface features may encode instructions for manufacturing the article of manufacture including the surface features; (7) the surface features may encode values that map to a digital CAD representation of the article of manufacture; (8) one or more of the surface features may be bumps and one or more of the surface features may be recesses; (9) the sequence may have a bit-length of three; and (10) surface features located in a first region of the surface may encode a first copy of a complete set of instructions for manufacturing the article of manufacture, and surface features located in a second region of the surface may encode a second copy of the complete set of instructions.

This invention may be implemented as a method comprising fabricating surface features on an object, which surface features encode information according to a code, wherein: (a) each respective surface feature consists of a bump on, or recess in, a surface of the article of manufacture; (b) each respective surface feature by itself, regardless of any state of any other surface feature, encodes a sequence of multiple bits, which sequence is determined, at least in part, by a discrete elevation of the respective surface feature; and (c) at least three different discrete elevations of surface features are significant in the code, each of the three discrete elevations, respectively, occurring in one or more of the surface features on the surface. In each case, elevation of a surface feature may be defined relative to elevation of a region of the surface that is immediately adjacent to and surrounds the surface feature. Furthermore: (1) the sequence encoded by each respective surface feature may be further determined in part by a discrete rotational orientation of the respective surface feature; (2) the sequence encoded by each respective surface feature may be further determined in part by a discrete shape of the respective surface feature; (3) the sequence encoded by each respective surface feature may be further determined in part by a discrete color of the respective surface feature; (4) the surface features may be concave; (5) the surface features may be convex; (6) the surface features may encode instructions for manufacturing the object, including the surface features.

This invention may be implemented as an article of manufacture comprising a physical object that encodes information according to a code; wherein: (a) a set of regions exist on a surface of the object; (b) each respective region, out of the set of regions, has a state, the state being defined by one or more parameters that are significant in the code, which parameters include discrete elevation of the region; and (c) at least three different discrete elevations are significant in the code, each of the three discrete elevations, respectively, occurring in one or more of the region. Elevation of any given region may be defined relative to elevation of an area of the surface that is immediately adjacent to and surrounds the given region. Furthermore, the states may encode instructions for fabricating the physical object.

Conclusion

While exemplary implementations are disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention. Numerous modifications may be made by one of ordinary skill in the art without departing from the scope of the invention.

What is claimed is:

1. An article of manufacture that includes surface features that encode information according to a code, wherein:
   (a) each surface feature consists of a bump on, or recess in, a surface of the article of manufacture;
   (b) each surface feature by itself, regardless of any state of any other surface feature, encodes a sequence of multiple bits, which sequence is determined, at least in part, by a discrete elevation of the surface feature;
   (c) at least three different discrete elevations of surface features are significant in the code, each of the three discrete elevations occurring in one or more of the surface features on the surface;
   (d) surface features located in a first region of the surface encode a first copy of a complete set of instructions for manufacturing the article of manufacture; and
   (e) surface features located in a second region of the surface encode a second copy of the complete set of instructions.

2. The article of manufacture of claim 1, wherein the sequence encoded by each surface feature is further determined in part by a discrete rotational orientation of the surface feature.

3. The article of manufacture of claim 1, wherein the sequence encoded by each surface feature is further determined in part by a discrete shape of the surface feature.

4. The article of manufacture of claim 1, wherein the sequence encoded by each surface feature is further determined in part by a discrete color of the surface feature.

5. The article of manufacture of claim 1, wherein the surface features are concave.

6. The article of manufacture of claim 1, wherein the surface features are convex.

7. The article of manufacture of claim 1, wherein the surface features encode values that map to a digital computer-aided design (CAD) representation of the article of manufacture.

8. The article of manufacture of claim 1, wherein one or more of the surface features are bumps and one or more of the surface features are recesses.

9. The article of manufacture of claim 1, wherein the sequence has a bit-length of three.

10. A method comprising fabricating surface features on an object, which surface features encode information according to a code, wherein:
    (a) each surface feature consists of a bump on, or recess in, a surface of the article of manufacture;

(b) each surface feature by itself, regardless of any state of any other surface feature, encodes a sequence of multiple bits, which sequence is determined, at least in part, by a discrete elevation of the surface feature;

(c) at least three different discrete elevations of surface features are significant in the code, each of the three discrete elevations occurring in one or more of the surface features on the surface;

(d) surface features located in a first region of the surface encode a first copy of a complete set of instructions for manufacturing the article of manufacture; and (e) surface features located in a second region of the surface encode a second copy of the complete set of instructions.

11. The method of claim 10, wherein the sequence encoded by each surface feature is further determined in part by a discrete rotational orientation of the surface feature.

12. The method of claim 10, wherein the sequence encoded by each surface feature is further determined in part by a discrete shape of the surface feature.

13. The method of claim 10, wherein the sequence encoded by each surface feature is further determined in part by a discrete color of the surface feature.

14. The method of claim 10, wherein the surface features are concave.

15. The method of claim 10, wherein the surface features are convex.

16. An article of manufacture comprising a physical object that encodes information according to a code; wherein:

(a) a set of regions exist on a surface of the object;

(b) each region, out of the set of regions, has a state, the state being defined by one or more parameters that are significant in the code, which parameters include discrete elevation of the region;

(c) at least three different discrete elevations are significant in the code, each of the three discrete elevations occurring in one or more of the regions;

(d) surface features located in a first region of the surface encode a first copy of a complete set of instructions for manufacturing the article of manufacture; and (e) surface features located in a second region of the surface encode a second copy of the complete set of instructions.

* * * * *